United States Patent
Sadjadpour

(10) Patent No.: US 12,500,755 B2
(45) Date of Patent: Dec. 16, 2025

(54) TECHNIQUES FOR ENCRYPTION BASED ON PERFECT SECRECY FOR BOUNDED STORAGE

(71) Applicant: The Regents of the University of California, Oakland, CA (US)

(72) Inventor: Hamid R. Sadjadpour, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 70 days.

(21) Appl. No.: 18/716,533

(22) PCT Filed: Dec. 8, 2022

(86) PCT No.: PCT/US2022/081132
§ 371 (c)(1),
(2) Date: Jun. 5, 2024

(87) PCT Pub. No.: WO2023/108037
PCT Pub. Date: Jun. 15, 2023

(65) Prior Publication Data
US 2025/0055682 A1     Feb. 13, 2025

Related U.S. Application Data

(60) Provisional application No. 63/265,151, filed on Dec. 8, 2021, provisional application No. 63/406,269, filed on Sep. 14, 2022.

(51) Int. Cl.
*H04L 9/08*     (2006.01)
(52) U.S. Cl.
CPC .................... *H04L 9/088* (2013.01)
(58) Field of Classification Search
CPC ...... H04L 9/088; H04L 9/0869; H04L 9/3093
See application file for complete search history.

(56) References Cited

U.S. PATENT DOCUMENTS

| 6,058,189 | A |  | 5/2000 | McGough |
| 7,334,125 | B1 | * | 2/2008 | Pellacuru ............... H04L 9/083 |
|  |  |  |  | 380/278 |

(Continued)

FOREIGN PATENT DOCUMENTS

| WO | 2018011825 A1 | 1/2018 |
| WO | WO-2023108037 A1 * | 6/2023 ............. H04L 9/088 |

OTHER PUBLICATIONS

Ueli M. Maurer; "Conditionally-Perfect Secrecy and Provably-Secure Randomized Cipher" Journal of Cryptology, Internal Associateion for Cryptologic Research, 1992, vol. 5, pp. 53-66.

(Continued)

*Primary Examiner* — Phy Anh T Vu
(74) *Attorney, Agent, or Firm* — Wolter Van Dyke Davis, PLLC; Eugene J. Molinelli

(57) ABSTRACT

Techniques for secure remote digital storage or transmission of a ciphertext message include determining a maximum storage capacity $\mathcal{B}$ of an adversary, determining a security parameter k, wherein $1 \ll k \ll m$, and determining a prime number n, such that $\mathcal{B} \leq 0.3kn$. A current public portion of random string $\alpha$, comprising n random elements, is read from a public site. A secret key z, wherein z has 2k elements, comprising k additive co-primes of n and k multiplicative co-primes of n is shared with a receiving site. An encryption key X, based on the secret key and the current public string, is determined and applied to a plaintext message M of length $\leq m$ to encrypt the plaintext message as $Y = M \oplus X$, thereby creating the ciphertext message Y, which can be placed on a public forum for receiving by a receiving node.

7 Claims, 5 Drawing Sheets

(56) References Cited

U.S. PATENT DOCUMENTS

| | | | |
|---|---|---|---|
| 2005/0008152 A1* | 1/2005 | MacKenzie | H04L 9/3013 380/44 |
| 2012/0250863 A1 | 10/2012 | Bukshpun et al. | |
| 2019/0036678 A1 | 1/2019 | Ahmed | |
| 2019/0294417 A1 | 9/2019 | Wu et al. | |
| 2020/0374100 A1 | 11/2020 | Georgieva et al. | |
| 2023/0396411 A1* | 12/2023 | Ohba | H04L 9/30 |
| 2024/0267213 A1* | 8/2024 | Guan | H04L 9/3093 |

OTHER PUBLICATIONS

Yonatan Aumann, et al.; "Everlasting Security in the Bounded Storage Model"; IEEE Transactions on Information Theory, vol. 48, No. 6, Jun. 2002; pp. 1668-1680.

C. E. Shannon, "Communication theory of secrecy systems", in The Bell System Technical Journal, vol. 28, No. 4, pp. 656-715, Oct. 1949.

Shafi Goldwasser, Silvio Micali, "Probabilistic encryption", Journal of Computer and System Sciences, vol. 28, Issue 2; pp. 270-299, 1984.

G. David Forney Jr., "On the role of MMSE estimation in approaching the information-theoretic limits of linear Gaussian channels: Shannon meets wiener," arXiv preprint cs/0409053, 2004.

T. Elgamal, "A public key cryptosystem and a signature scheme based on discrete logarithms," in IEEE Transactions on Information Theory, vol. 31, No. 4, pp. 469-472, Jul. 1985.

W. Diffie and M. Hellman, New directions in cryptography; in IEEE Transactions on Information Theory, vol. 22, No. 6. pp. 644-654, Nov. 1976.

Biham, Eli, and Adi Shamir, "Differential cryptanalysis of DES-like cryptosystems." Journal of Cryptology 4.1 (1991): 3-72.

R. G. Gallager, "Low-Density Parity-Check Codes", Cambridge, MA: MIT Press. 1963.

C. H. Bennett, G. Brassard, C. Crepeau and U. M. Maurer, "Generalized privacy amplification", in IEEE Transactions on Information Theory, vol. 41, No. 6, pp. 1915-1923, Nov. 1995.

C. Cachin and U. Maurer, "Unconditional security against memory bounded adversaries", in Advances in Cryptology—Crypto '97, 1997.

S. Dziembowski and U. Maurer, "Tight security proofs for the bounded-storage model" in Proceedings of the thirty-fourth annual ACM symposium on Theory of computing (STOC '02).

Lu, Chi-Jen. "Hyper-Encryption against Space-Bounded Adversaries from On-Line Strong Extractors." Crypto '02 Proceedings of the 22nd Annual International Cryptology Conference on Advances in Cryptology, 2002, pp. 257-271.

E. Savas and B. Sunar, "A practical and secure communication protocol in the bounded storage model". In Proceedings of the 4th international conference on Networking—vol. Part II (ICN'05). Springer-Verlag, Berlin, Heidelberg, 707-717.

M. O. Rabin, "Provably unbreakable hyper-encryption in the limited access model," IEEE Information Theory Workshop on Theory and Practice in Information-Theoretic Security, 2005, pp. 34-37.

* cited by examiner

TECHNIQUES FOR ENCRYPTION BASED ON PERFECT SECRECY FOR BOUNDED STORAGE

CROSS-REFERENCE TO RELATED APPLICATIONS

This application is a National Stage entry and claims priority to PCT/US22/81132, filed Dec. 8, 2022, which claims benefit of U.S. Provisional Application No. 63/265,151, filed Dec. 8, 2021, this application also claims benefit to U.S. Provisional Application No. 63/406,269, filed Sep. 14, 2022, the entire contents of both Provisionals of which are hereby incorporated by reference.

STATEMENT OF GOVERNMENTAL INTEREST

This invention was made with government support under Contract No. W911NF-20-1-0253 awarded by the Department of the Army. The government has certain rights in the invention.

BACKGROUND

One of the central problems in the field of cryptography is to design a practical and provably secure cryptosystem. Suppose Alice wants to send a message to Bob over a public channel on which Eve is listening. A practical cipher that can allow Alice to send the message to Bob is desired, such that Eve cannot intercept the message. Security of most of the current practical protocols depends on unproven assumptions of the computational complexity of certain problems, like discrete logarithms. This means that in the future it will be possible to find polynomial time algorithms for these hard problems, jeopardizing the security of previously sent messages. In fact, this has been the case with the Data Encryption Standard (DES), which was once thought secure but later turned out to be susceptible to differential cryptanalysis. These schemes thus cannot give everlasting security as Eve can store all the communications and can later decipher once there is a relevant technological breakthrough.

The one-time pad scheme is an example of provably secure cipher provided that for every message, a uniformly distributed unique and independent key having a length equal to the message length is chosen for encryption. Unfortunately, the large key size makes this scheme impractical. Claude Shannon later showed that in order to achieve provable security, the entropy of space of keys should be at least as large as that of plain text space. Hence one-time pad scheme is the optimal private key, a provably secure cipher, but impractical.

SUMMARY

Techniques are described for encoding data that will be publicly exposed, such as during transmission or while in cloud storage. The encoding scheme achieves perfect cryptographic secrecy in a bounded storage model.

In one set of embodiments, a method implemented on a hardware processor for secure remote digital storage or transmission of a ciphertext message, includes determining a maximum storage capacity B of an adversary, a security parameter k, wherein $1 \ll k \ll m$, (m message bits) and a prime number n, such that $B \leq 0.3kn$. The method also includes reading from a public site a current public portion of a random string $\alpha$. The random string $\alpha$ having been determined and a portion thereof made public by the sending party, by intended message receiving party, or by a trusted third party. The random string $\alpha$ includes k elements and each k element includes n random bits. The current public portion is the next n bits. The method also includes privately sharing with a receiving node a secret key z. The secret key z has 2k elements, comprising k additive co-primes of n, and k multiplicative co-primes of n. The method also further includes determining an encryption key X based on the secret key and the current public portion of the random string $\alpha$. Still further yet, the method includes determining a plaintext message M of length $\leq m$ and encrypting the message as $Y = M \oplus X$ to create the ciphertext message Y, wherein the symbol indicate an exclusive OR (XOR). Yet further again, the method includes placing the ciphertext message Y on a public forum for receiving by a receiving node.

In other sets of embodiments, a computer readable medium, or apparatus, or system is configured to perform one or more steps of the above method or to store or decode the encoded data produced by the above method.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Figure 1:
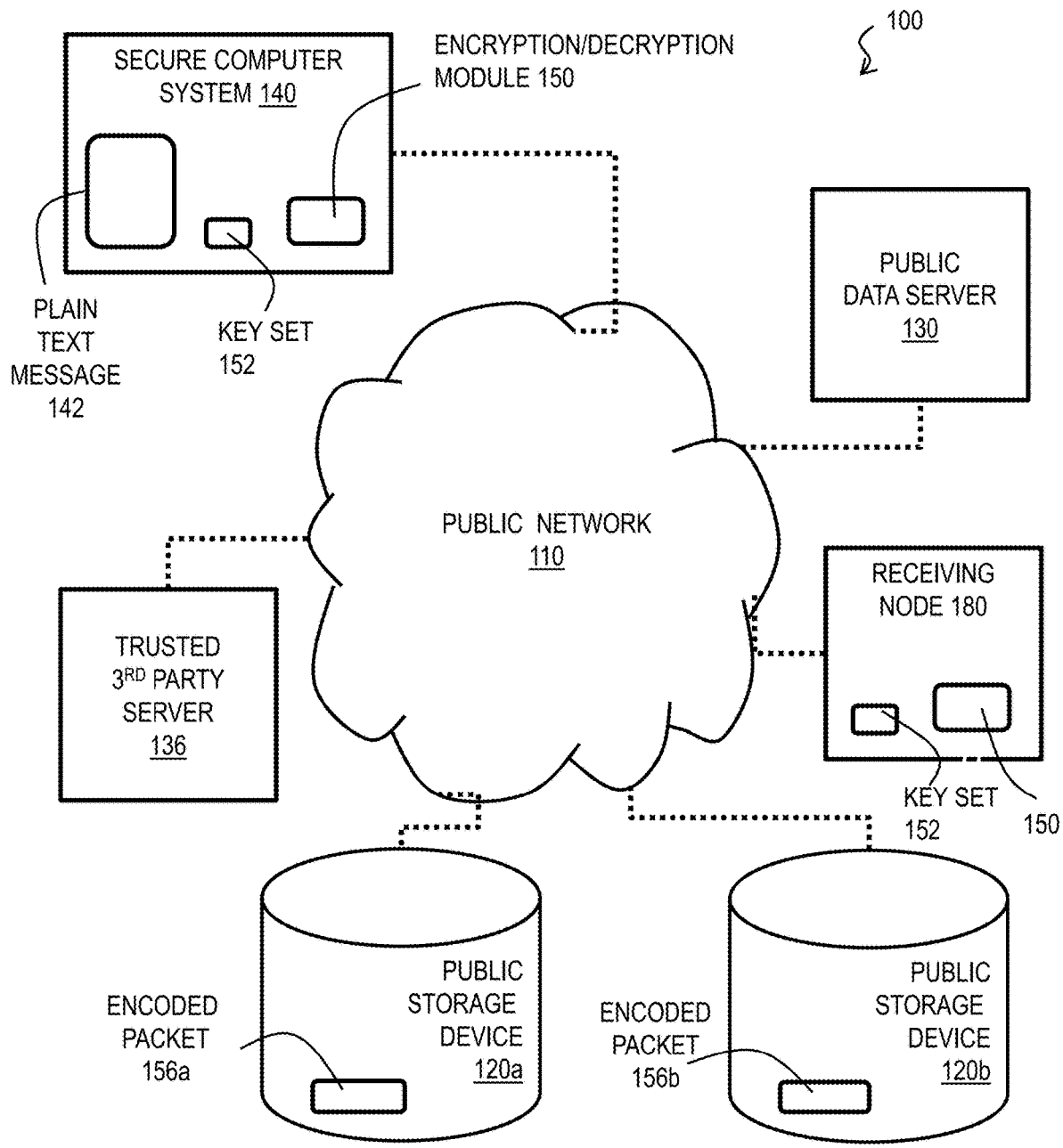
FIG. 1 is a block diagram illustrating the various devices for receiving/sending/storing a ciphertext message encrypted according to an embodiment.

A method, computer readable medium, apparatus and system are described for encoding data that will be publicly exposed, such as during transmission or while in cloud storage. The encoding scheme achieves perfect cryptographic secrecy in a bounded storage model.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of public cloud-based data storage, e.g., data storage on a network that is at least in part exposed to public access. However, the invention is not limited to this context. In other embodiments the encoding is used in communications systems, such as over wireless cellular and ad hoc networks, with a trusted partner for whom a perfectly secure channel is available for delivering the ciphertext, or plaintext, or some combination thereof.

1. DESCRIPTION OF THE PROBLEM

In the classical Shannon problem, Alice uses a random coding mechanism to achieve perfect secrecy by encoding a message with a unique key that is selected uniformly at random from the set of all keys. The number of keys is at least as large as the number of messages. Bob also gets the same set of keys and uses them for decoding. Eve does not have these keys and cannot decode the message. In this scheme, if Alice wants to achieve perfect secrecy for data transmission, she needs to transmit all random keys to Bob and Bob needs to store them for use in decrypting the data. Since the number of the key bits is as large as the number of the message bits, even when employing a distributed cloud storage system, this technique is not practical.

A cloud storage system model is different from a traditional communications model as discussed by Shannon. In a cloud storage model, Alice wants to store some data on the cloud and retrieve them later. In other words, Bob, from the examples set forth above, is the same as Alice; but in this scenario data retrieval is performed at a later time when the message is retrieved from cloud storage. As in the above examples, Alice intends to prevent Eve from obtaining any information about the stored contents in the cloud.

If Alice wants to achieve perfect secrecy, similar to the traditional Shannon cipher system, she needs to locally (that is, not in the cloud) and securely store a separate key for each message that she stores on the cloud, and then use that key to retrieve that message from the cloud-stored ciphertext. Therefore, using Shannon, she will need local storage of the same size as cloud storage to store the keys. This clearly does not benefit from the advantage of offsite massive storage offered by cloud storage; and, thus, is not a practical way to use cloud storage systems. Even assuming that Alice has such a local storage capability, it would be to Alice's advantage not to store any data on the cloud, but instead to store the plaintext files locally instead of locally storing the keys! Therefore, in practice, Shannon's scheme does not work for cloud storage systems.

Using codes like Maximum Distance Separable (MDS) is very common in storage systems due to their repair capabilities. However, certain requirements are needed to secure the applications that use these codes. Certain prior art scholarly papers describe the security of distributed storage systems with MDS codes. One prior art paper studied the secrecy capacity of MDS codes. Certain authors also proposed security measures for MDS coded storage systems. Shah proposed information-theoretic secure regenerating codes for distributed storage systems. Rawat used Gabidulin codes together with MDS codes to propose optimal locally repairable and secure codes for distributed storage systems. It is known in the prior art to use an existing forward error correction code and by modifying it, to achieve security for distributed storage systems.

Kumar has proposed a construction for repairable and secure fountain codes. He achieves security by concatenating Gabidulin codes with Repairable Fountain Codes (RFC). Their specific design allows one to use Locally Repairable Fountain Codes (LRFC) for secure repair of the lost data.

Network coding schemes have been shown to be very efficient from a security point of view. Prior art authors showed that network coding can be used to achieve perfect secrecy when network encoded files are sent through multiple paths and only one of the paths is compromised. Another author studied the problem of "weakly secure" network coding schemes in which even without perfect secrecy, no meaningful information can be extracted from the network during transfer of data. The problem of weakly secure storage systems has also been studied. Algorithms to achieve weak security have been proposed and weakly secure data exchange with generalized Reed Solomon codes have been studied.

Recently, there has been considerable interest in studying methods of achieving physical layer security through the use of coding techniques. Certain authors have proposed a new scheme to use error control codes for cryptography purposes. Other authors provided physical layer security with a special code design. Still other authors studied different methods for achieving asymptotic perfect secrecy using coding techniques. They proposed a method for achieving asymptotic perfect secrecy in wireless networks using random coding of cached contents. This method is then extended to include secure content update. The prior art publications have proposed new coding schemes which are able to provide asymptotic perfect secrecy and privacy at the same time. Note that these works also relied on specific known forward error correction code. In all prior work in the literature, asymptotic perfect secrecy was achieved, which required the use of infinite size data in order to achieve perfect secrecy. Clearly, this is not a practical solution for perfect security.

There are other efforts to achieve perfect secrecy asymptotically. For example, the concept of codes for security without any error correction capability. This was accomplished by using sparse vectors to achieve asymptotic perfect secrecy in cloud storage systems. One proposed method significantly outperforms the Advanced Encryption Standard (AES) in terms of computational complexity while providing asymptotic perfect secrecy. That coding scheme has the unique ability of providing asymptotic perfect secrecy with low decoding complexity. The new code for security still suffered from the problem of achieving perfect secrecy asymptotically which does not make this technique completely secure.

2. BOUNDED STORAGE MODEL

To develop a practical protocol that can guarantee everlasting security, a limit is imposed on the storage capacity of the adversary Eve. This is called the Bounded Storage Model. There is a fixed bound B on Eve's storage at a given point of time. The storage should be bounded only during execution of the protocol and the bound can be removed when the protocol concludes. The bounded storage model does not impose a bound on the computational power of Eve, unlike a bounded space model. In various embodiments disclosed herein, a large random string $\alpha$ is publicly available for a limited time. The adversary can compute any function on $\alpha$, but can only store $\mathcal{B}$ bits of the output due to the storage bound. This cipher is provably secure even if the secret key is revealed to Eve later.

Some unbounded storage models can also be treated as bounded as explained later herein when describing cloud storage applications. Therefore, these embodiments can be applied to many systems with proper implementation.

3. INTEGERS MODULO N

The inventor employs finite group operations for the transformation of keys and their proof of perfect security utilizes ideas from group theory. The invention uses the finite abelian group $\mathbb{Z}_n$, where n is natural number, with elements $\{0, \ldots n-1\}$ and addition is modulo n as a group operation. The inventor also uses the group U(n) with multiplication modulo n as a group operation. The elements of U(n) are integers from 1 to n-1 and are co-prime to n. For any prime number n, elements of U(n) become $\{1, \ldots, n-1\}$.

Any $g \in G$ is called the primitive element of G if $\{e, g, g^2, \ldots G^{|G|-1}\}$ are all distinct and enumerate all the elements of G. $g \in \mathbb{Z}_n$ is a primitive of $\mathbb{Z}_n$ if g is co-prime to n. Thus, the elements of multiplicative group U(n) are all primitive elements of $\mathbb{Z}_n$. The primitive elements have important properties that are used in below proofs of the distribution of keys.

4. RELATED WORK

Maurer formally introduced the bounded storage model. The security of the protocol was established when the adversary can store only a subset of bits from a random string. The security in the case of a general bounded adversary that can compute and store the output of some chosen Boolean function on the string is not proved.

Privacy amplification techniques, for two parties to agree on a provably secure key is discussed in in the prior art based on which Cauchin and Maurer gave their first provably secure protocol for the general bounded model, but the protocol is fairly complex and uses costly operations (multiplication in fields $\mathcal{F}_{2^t}$).

In a seminal paper by Aumann, Ding and Rabin, a protocol with provable security against the general bounded adversary is proposed, which is simple to implement and uses novel ideas in its proof. A major drawback is that the size of key or random string required is very large. Another prior art protocol reduces the random string size to some extent but the size parameters are still dependent on the message length. In yet another work, the author discusses use of extractors to create one-time pad keys for provable security, even if the public string is not perfectly random.

Practical implementation of a protocol for security against a limited access model using a large network of computers storing random pages is known. The assumption for security is that the adversary does not have access to all the information on the network during protocol.

5. OVERVIEW OF THE SOLUTION

In one prior art paper, two protocols are proposed for the bounded storage model that guarantee everlasting security. The size of the publicly available random string $\alpha$ required in protocol one is very large (and proportional to the message length) which is a hurdle in its practical implementation as a large truly random string is difficult to obtain. Protocol two employs a shorter $\alpha$, but the key length required is longer than the message length, which is also impractical. In another prior art protocol, the size of public string $\alpha$ is dependent on the message length, and yet another prior art protocol requires using an extractor for key generation.

Herein, improvements over these results are provided based on a new protocol that avoids the drawbacks of all the aforementioned protocols, making it more practical, by using a short $\alpha$ and a short key, both of which are independent of the size of message. The protocol can be implemented using only finite group arithmetic and XOR operations. The protocol is secure even if the key is revealed to the adversary after the message has been transferred.

Specifically, a new secure cryptosystem for two party communication provides security in the face of new technological breakthroughs. Most of the practical cryptosystems in use today will be breached at some time in the future with newly-developed sophisticated methods. This jeopardizes the future security of older but highly confidential messages.

The new protocol is based on the bounded storage model. The protocol is secure as long as there is bound on the available storage, however large it may be. Also provided are methods to extend the protocol to unbounded storage models where access by the adversary is limited. The new protocol is a substantial improvement over previously known protocols and uses a short key and an optimal number of public random bits the size of which is independent of the message length. The smaller and constant length of the key and the public random string makes the scheme more practical. The protocol generates the key using elements of the additive group $\mathbb{Z}_n$. The new protocol is very generalized, but reduces to the protocol in the prior art paper referred to above as a special case, where all the primitives are chosen as 1.

The new protocol is a step forward in making provably secure cryptosystems practical. An important open problem raised in the prior art was designing an algorithm with a short key and the size of public random string $O(\mathcal{B})$ where $\mathcal{B}$ bounds the storage of the adversary. The new protocol satisfies these conditions and is easy to implement.

Suppose there is a security parameter k, (a computational security numerical parameter, which is a measure of how hard it is for an adversary to break the cryptographic scheme; in one embodiment k=200), the storage of the adversary is bounded by B, and n is a prime number, such that B≤0.3nk. In one embodiment n is about 10^9. Alice samples k starting values and primitives each from the group $\mathbb{Z}_n$, where here k again represents the security parameter. While the k starting values are sampled uniformly from $\mathbb{Z}_n$, primitives can be sampled from any probability distribution over U(n), where n is a prime number and U(n) comprises all numbers between 1 and n−1. To securely send a message, both Alice and Bob have shared a secret key of a length equal to the sum of the starting values and primitives (2k log n bits), need a random string α of a length kn and need to store km bits of α for performing encryption and decryption.

One prior art protocol is a special case of the presented embodiments when all primitives ($p_i$) equal 1. This is the same as sampling the primitives from a probability distribution over U (n) that is degenerate at 1. Moreover, if primitive values are fixed then the key length becomes k log n and α is of length kn, which is better than any previously known protocols. The present invention improves over this prior art protocol with α significantly smaller than the prior art, while using a key of about the same size for the same bounded storage value and the same security parameter. See Table 1 below.

Embodiments of a new protocol are described immediately below, after which the attack model is described. The main result is then provided, followed by the proof. The proof is provided purely to enhance the description of the protocol. The protocol and embodiments are not limited by the completeness or accuracy of any or all of the proofs.

6. DESCRIPTION OF THE PROTOCOL

Let A be any set and $f$ be any probability distribution defined over A. Then $$a \xleftarrow{f} A$$

denotes sampling a from A according to $f$. If $f$ is a uniform distribution, then use $$a \xleftarrow{R} A$$

to denote sampling a from A.

Suppose Alice wants to send message $M \in \{0, 1\}^m$ (where m indicates the number of bits in the message) to Bob and the adversary has a bound on storage B. Let k be a security parameter and n be a prime number chosen such that $B \leq 0.3kn$. Alice and Bob establish a secret key z=(sv, p) such that $sv=(sv_1, \ldots sv_k)$ and $p=(p_1 \ldots p_k)$, $$sv \xleftarrow{R} \mathbb{Z}_n^k$$

and $$p \xleftarrow{f} U(n)^k$$

for any probability distribution $f$ over the set. From the description above, we have |z|=2k log n.

The protocol uses a random string $\alpha \in \{0,1\}^{nk}$ where $\alpha=(\alpha_1, \ldots, \alpha_k)$ and $\alpha_i \in \{0,1\}^n$, that is publicly available for a short time. The index of the string of $\alpha_i$'s runs from 0 to n−1 and $\alpha_i$ [j] is the $(j+1)^{th}$ bit of $\alpha_i$.

The encryption and decryption procedure, in the form of software code, are set forth below and in FIG. 3.

---

Procedure 1 Encryption and Decryption

---

Message M ∈ $\{0, 1\}^m$
Secret Key z = $(sv_1, \ldots, sv_k, p_1, \ldots, p_k) \in \mathbb{Z}_n^k \times U(n)^k$
Random string α = $(\alpha_1, \ldots, \alpha_k) \in \{0, 1\}^{kn}$
1: for i = 1 to m do
2:   for j = 1 to k do
3:     Compute $\sigma_{ij} = (sv_j + (i - 1) \cdot p_j)$ mod n
4:   endfor
5:   Set $s^{(i)} = (\sigma_i 1, \ldots, \sigma_i k)$ 6:   Compute $X_i = \bigoplus_{j=1}^{k} \alpha_j[\sigma_{ij}]$.

7: endfor
8: Alice and Bob set X = $(X_1, \ldots, X_m)$
9: Alice encrypts Y = M ⊕ X and sends.
10: Bob receives Y and decrypts X = y ⊕ X.|

---

By choosing the probability density function $f$ for sampling primitives to be degenerate, i.e., Pr $(p_i)$=1 for $1 \leq i \leq k$, a protocol that uses a key z=sv (|z|=k log n, as p is fixed), which gives the same security as prior art ciphers, but advantageously with a shorter key.

In general, in the presented embodiments the size of the key z and the a bits are both independent of the message length. The presented embodiments are an improvement over prior art encryption/decryption techniques, with the results for one such prior art technique set forth in Table 1 below.

For the present invention (New Protocol in Table 1 below), the approximate bit size of the public random string α and the key z required for sending a message of length m=50,000 bits for different storage bounds are listed in Table 1 and compared with a prior art protocol (Old Protocol). As can be seen, the inventive protocol reduces the size of α significantly. For these values, the adversary can distinguish between two random messages $M^{(0)}$ and $M^{(1)}$ with a probability of only $4.27 \times 10^{-16}$.

TABLE 1

| | (for k = 200) | | | |
|---|---|---|---|---|
| | New Protocol | | Old Protocol | |
| Bound $\mathcal{B}$ | Size of α | Size of key | Size of α | Size of key |
| $10^{15}$ | $3.6 \times 10^{15}$ | $1.8 \times 10^4$ | $1.7 \times 10^{20}$ | $1.0 \times 10^4$ |
| $10^{18}$ | $3.4 \times 10^{18}$ | $2.2 \times 10^4$ | $1.7 \times 10^{23}$ | $1.2 \times 10^4$ |
| $10^{20}$ | $3.4 \times 10^{20}$ | $2.4 \times 10^4$ | $1/7 \times 10^{25}$ | $1.4 \times 10^4$ |

The presented embodiments can be extended beyond the bounded storage model.

Note also that embodiments apply for any function $A_1$. One immediate application of this result is when $A_1$ is selected as a matrix of size $n \times \mathcal{B}$ with each column having all zeroes except in one location a 1. This is equivalent to the fact that if the n bits are distributed across thousands of servers in a data center and the eavesdropper can access only a subset of those servers and obtains information about $\mathcal{B}$ bits, then the encryption using the presented techniques is still secure. The embodiments presented thus have multiple applications by selecting a proper $A_1$.

7. ATTACK MODEL

The adversary has bounded storage which means that the adversary can compute any function and store its output $\eta = f(\alpha)$ as long as $|\eta| \le B \le 0.3kn$. A general attack by adversary can be divided into two phases:

Phase I: During this phase, the string $\alpha$ is publicly available. The adversary is not computationally bounded and can compute any function on $\alpha$. The adversary computes and stores $A_1(\alpha) = \eta$, where $A_1: \{0,1\}^{kn} \to \{0,1\}^{0.3kn}$, where $A_1$ is any Boolean function that transforms a binary sequence of length $kn$ to another binary sequence of length $0.3kn$.

Phase II: $\alpha$ is not publicly available now and the only information the adversary has about $\alpha$ is from the output stored in Phase I. Now the adversary is provided with Y, (the ciphertext), the key z, and still has $\eta$ from Phase I. The adversary attempts to compute information on M from the given data. The adversary uses an algorithm $A_2$ and outputs $A_2(\eta, Y, z)$, which gives information of 1-bit on M. The inventors have determined that for any $A_1$ and $A_2$, the adversary can gain even 1-bit of information about M only with a probability that is exponentially small in k.

In order to evaluate the computational complexity of this method when some encrypted files with correlated keys are hacked by an intruder, assume n=5000 and $T_0 = 100$.

8. STRUCTURES

FIG. 1 is a block diagram of an ecosystem 100 comprising devices for sending or receiving or storing a message encrypted according to the embodiments. The illustrated devices are linked by a public network 110.

A secure computer System 140 serves as a sending node for a message. A plain text message 142 is created at the secure computer system 140 and using information in the key set 152, an encryption/decryption module 150 encrypts the plain text message 142 using the techniques of the described embodiments. The encrypted message is sent to a receiving node 180 via a public network 110.

At the receiving node 180, an identical key set 152 and an encryption/decryption module 150 decrypts the received encrypted message, to generate the plain text message. Here too, the data set 152 and encryption/decryptions module 150 use decryptions techniques as described by the embodiments. Thus, the plain text message is sent from the secure computer system 140, serving as the sending node, to the receiving node 180, via the public network 110 in encrypted form that cannot be easily decrypted, as described herein. However, the data set and encryption/decryptions module 150 at the receiving node 180 provides the information for decrypting the ciphertext to regenerate the plain text message.

In addition to or in lieu of sending the encrypted message through the public network 110 to the receiving node 180, the encrypted message can be stored in one or both of the public storage devices 120a and 120b. As stored in the public storage device 120a and 120b, the respective encrypted messages are referred to as an encoded packet 156a and 156b.

As described herein, the encryption and decryption techniques of the embodiments requires use of a secret key for both encrypting the plaintext message and for decrypting the cipher text message. In an embodiment wherein the secret key is provided by a trusted third-party security authority, that secret key can be provided from the trusted third-party server 136 in FIG. 1.

The encryption and decryption techniques described herein also require use of a random string designated $\alpha$. That random string is publicly available for certain times and can therefore be made available on a public server 130 of FIG. 1.

Figure 2:
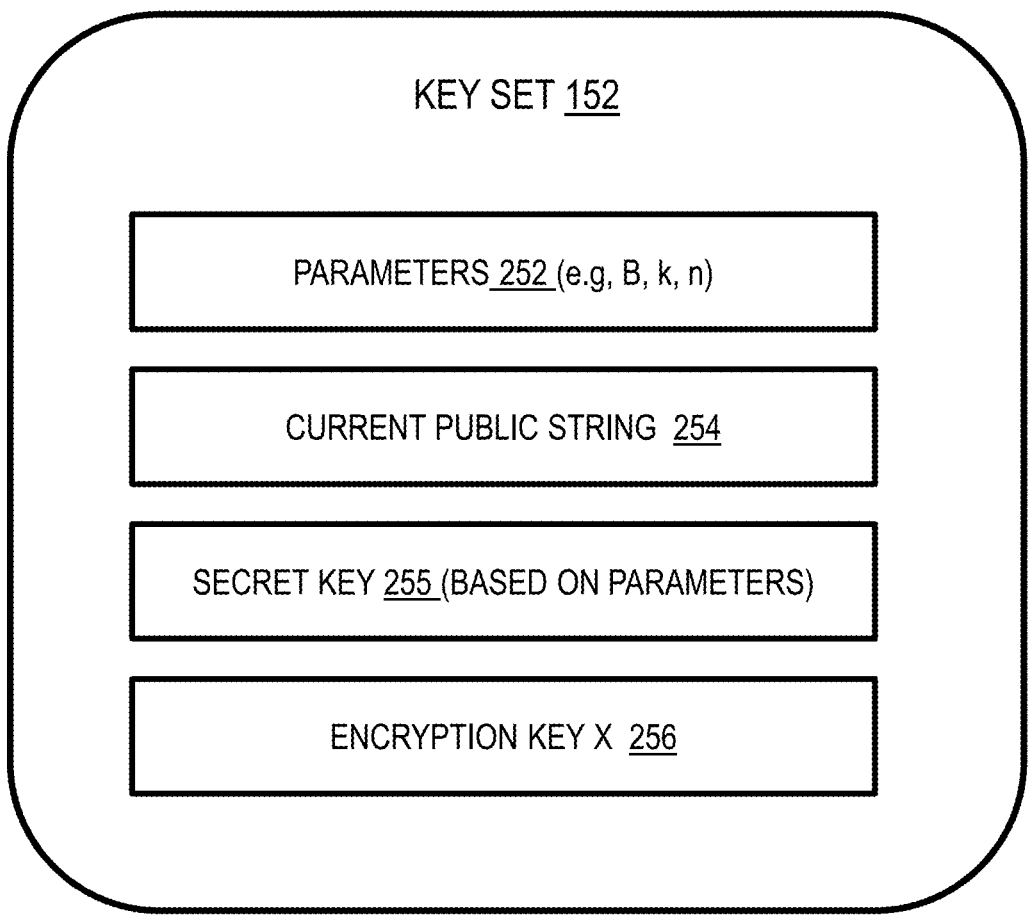
FIG. 2 is a block diagram depicting the information stored within the key set of FIG. 1.

FIG. 2 sets forth the various parameters and data elements stored within the key set 152. Parameters 252, include the adversary's bounded storage $\mathcal{B}$, the security parameter k, and the prime number n. The current public string 254, referred to herein as $\alpha$, is also stored within the key set 152. A secret key 255, based on the various parameters ($\alpha$, k, n) is also stored within the key set 152. Finally, the encryption key X 256, as derived from the current public string and the secret key, is stored within the data set 152.

9. METHODS

Figure 3:
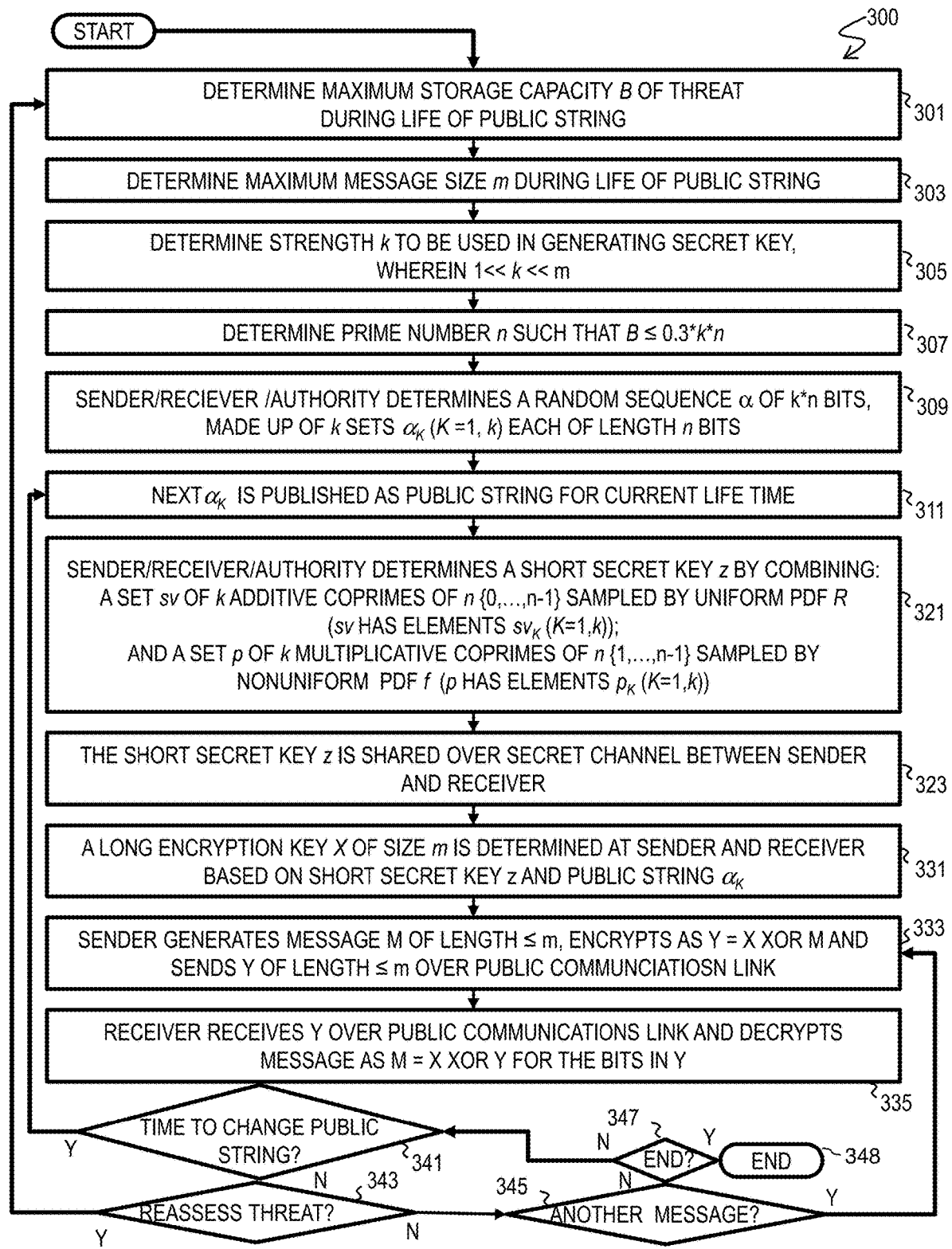
FIG. 3 is a flowchart illustrating an example system for producing encoded data that is exposed to the public according to an embodiment.

FIG. 3 is a flowchart depicting the steps for determining a long encryption key X and employing X to encrypt the message M at the sending node and decrypt the received data at the receiving mode to thereby regenerate the message M.

At step 301 the maximum storage capacity of a threat or adversary during the life of a public string $\alpha$ is determined. Any method may be used to determine the maximum storage capacity B of the eavesdropper. In some embodiments the maximum storage capacity is the total capacity estimated for an adversary. In some embodiments the maximum capacity is a maximum capacity that it is reasonable for the adversary to devote to eavesdropping the messages M to be sent by this sender among many senders. For example, if the value of the message is V then it is not reasonable for the eavesdropper to devote 10V of storage capacity value to the problem so that B>>the amount of storage worth V is a reasonable choice for B. As another example, the timelessness of the message can influence the practical limit for the value of B to be used in the method. For example, if the sender is sending thousands of messages in a current time interval but each message is only valuable for a short time, e.g., before the sender takes some action that is seen publicly, such as travel or stock purchase, then the value of B that is reasonably devoted to any one message is different than if the secret is to be held for a long time. The value of B also depends on the application. For example, in wireless systems that the user is moving, it is reasonable to assume that the eavesdropper is mobile and therefore, the amount of storage it can carry is limited. Clearly, for Cloud storage systems, the eavesdropper is tapping into the system and it probably can carry significantly larger amount of storage than a mobile eavesdropper. One approach to limit the capability of the eavesdropper to store the entire public random string is to communicate the public random string between users at different times and locations such that it make it impossible for the eavesdropper to listen and save the entire public random string. This is equivalent of limited storage capacity by the eavesdropper.

At a step 303 the maximum message size is determined. At step 305 a security parameter k that will be used to generate the secret key is determined. $1 \le k \le m$. At step 307 a prime number n is determined, such that $\mathcal{B} \le 0.3 * k * n$. Generally, the value of $\mathcal{B}$ is determined by the sending and receiving parties based on currently-known and near-term expected storage capacity available to an eavesdropper. Of course, the expected storage capacity increases with time as available memory expands. Then values for n and k are then determined according to the above equation that relates $\mathcal{B}$, n and k.

At step 309 either the sender, the receiver, or a trusted security authority determines a random sequence $\alpha$. comprising k*n bits. Generally, in one embodiment $\alpha$ is generated by a hardware device that generates random numbers, such devices are known in the art. Exemplary values for α are given in Table 1 above.

At step 311 the next n bits of α values are published as a public string and they remain publicly available for a current lifetime.

At step 321 the sender, receiver, or the security authority, determines a short secret key z with k $sv_i$ (starting values) and k $p_i$(primitives). The equation for determining the short secret key z from the starting values and the primitives is set forth above.

After the short secret key z is determined, at step 323 that short secret key is shared between the sender and receiver over a secret channel. The key can be shared using public-private encryption techniques that are known. Physical layer security techniques, also known in the art, can be used to share the secret key. Other secret key sharing techniques are known in the art.

A long encryption key X of length m is determined by both the sender and receiver at a step 331. The long encryption key X is derived from the short secret key z and the current public portion of string α.

The sender generates a message M of length≤m, encrypts the message as Y=X⊕M, where the symbol indicates exclusive OR (XOR) and sends the encrypted message Y over a public communications link to the receiver. See step 333.

At step 335 the receiver receives the encrypted message Y and decrypts the message according to M=Y⊕X to regenerate the original message M.

Decision step 341 inquires whether the current public portion of random string α should be changed. An affirmative response returns processing to step 311 where the new public portion of the string alpha is published. A negative response continues processing to step 343 to reassess the threat. An affirmative response continues processing back to step 301 to redetermine the maximum storage capacity of the adversary. A negative response continues processing to decision block 345. If another message is waiting to be encrypted and sent, processing continues to step 333 to generate ciphertext based on the new message text. If another message is not in queue to be encrypted, the process ends at a block 347.

10. COMPUTATIONAL HARDWARE

Figure 4:
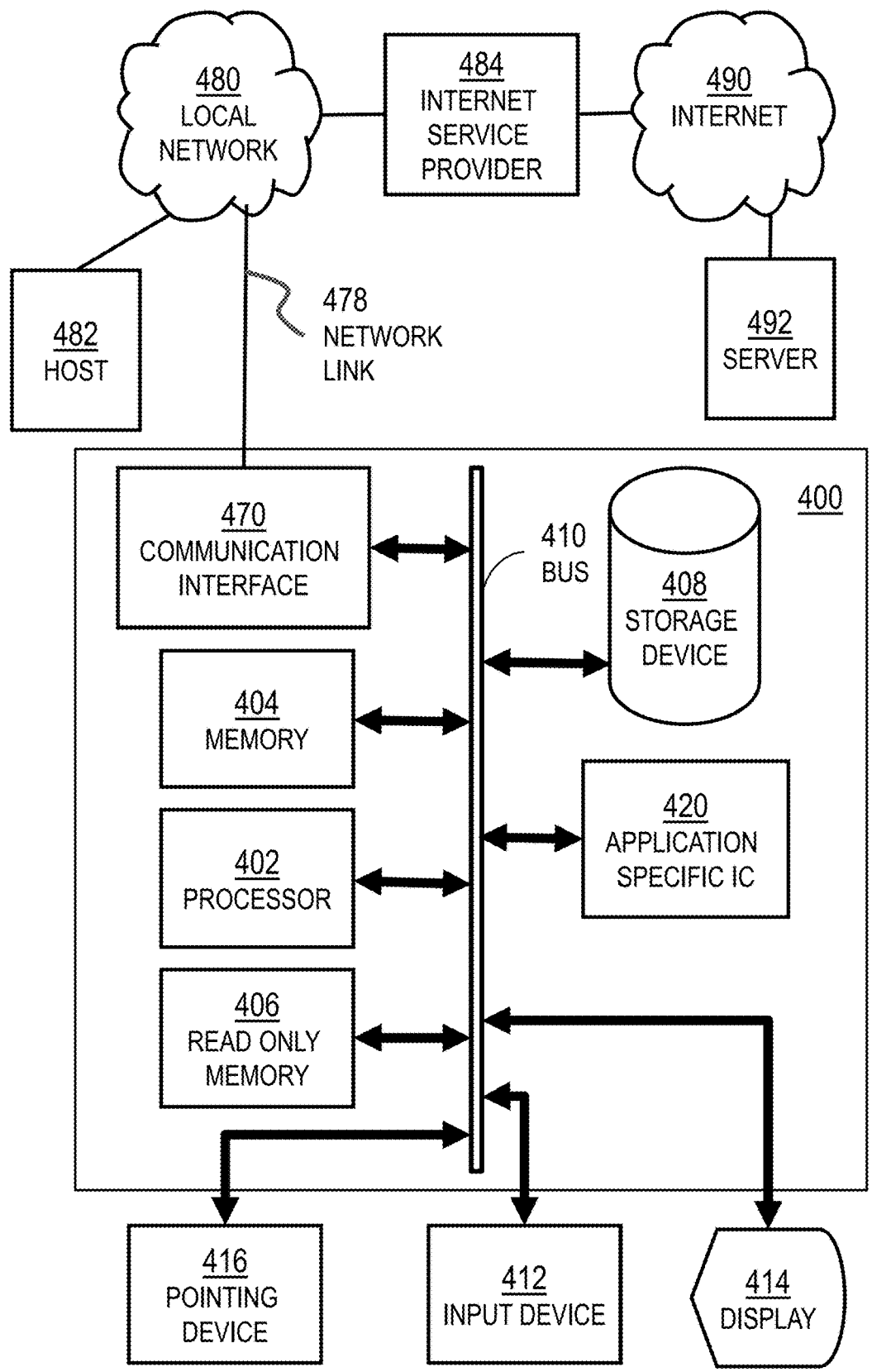
FIG. 4 is a block diagram illustrating a computer system upon which an embodiment of the invention may be implemented.

FIG. 4 is a block diagram that illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 400, or a portion thereof, constitutes a means for performing one or more steps of one or more methods described herein.

A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitutes computer instructions.

Computer system 400 also includes a memory 404 coupled to bus 410. The memory 404, such as a random-access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 470 sends and receives electrical, acoustic or electromagnetic signals, including infrared and optical signals, that carry information streams, such as digital data.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 402, except for carrier waves and other signals.

Logic encoded in one or more tangible media includes one or both of processor instructions on a computer-readable storage media and special purpose hardware, such as ASIC 420.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, carry information to and from computer system 400. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received or may be stored in storage device 408 or other non-volatile storage for later execution, or both. In this manner, computer system 400 may obtain application program code in the form of a signal on a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to a signal on an infra-red a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

Figure 5:
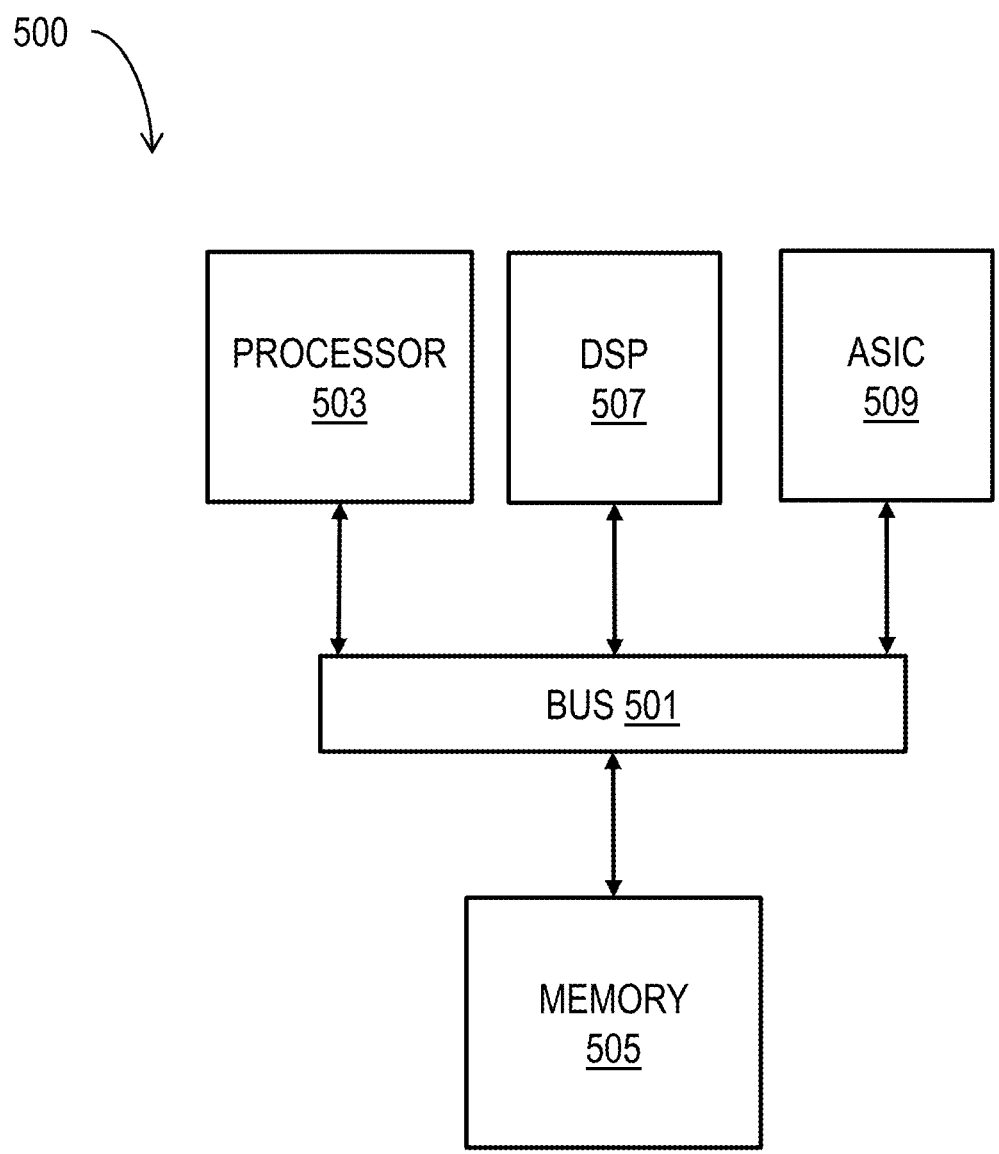
FIG. 5 illustrates a chip set upon which an embodiment of the invention may be implemented.

FIG. 5 illustrates a chip set 500 upon which an embodiment of the invention may be implemented. Chip set 500 is programmed to perform one or more steps of a method described herein and includes, for instance, the processor and memory components described with respect to FIG. 4 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 500, or a portion thereof, constitutes a means for performing one or more steps of a method described herein.

In one embodiment, the chip set 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 503 and accompanying components have connectivity to the memory 505 via the bus 501. The memory 505 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 505 also stores the data associated with or generated by the execution of one or more steps of the methods described herein.

11. ALTERNATIVES, EXTENSIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments. Use of the word "determining," such as determining a value or determining a character string, refers to computing internally, receiving input, reading a file, and receiving a message in response to a request or receiving an unsolicited message.

12. PROOF

To show the security of our protocol, we use the notion of semantic security given by Goldwasser and Micali in [4]. We consider two messages $M^{(0)}$ and $M^{(1)}$ in our message space. One of these messages is chosen uniformly, encrypted, and sent to the adversary. The adversary cannot distinguish between the two messages given $\eta$, z, Y except for an exponentially small probability.

Theorem 1.

Theorem 1. For any two messages $M^{(0)}$, $M^{(1)}$ of size m, any algorithm $A_1$: $\{0, 1\}^{kn} \to \{0, 1\}^{0.3\ kn}$ and any decoding algorithm $$A_2 \text{ for } \alpha \xleftarrow{R} \{0, 1\}^{kn},$$
$$z = (sv, p),$$
$$sv \xleftarrow{R} \mathbb{Z}_n^k$$
and
$$p \xleftarrow{f} \{1, \ldots n-1\}^k$$

for any probability distribution $f$, we have $$\left|Pr[A_2(A_1(\alpha), z, X \oplus M^{(1)} = 1] - Pr[A_2(A_1(\alpha), z, X \oplus M^{(0)} = 1]\right| < m \cdot \left(2^{-k/3+1} + 2^{-0.001n+2}\right)$$

The proof is organized into four parts. We prove some results concerning distribution of $s^{(i)}$ in the first section. Then we cover definitions and lemmas which are helpful in the proof in the second section. In the third section, we show the single bit security and we prove the main theorem in the fourth section.

A. Distribution of Keys

In the protocol, we have $s^{(i)} = (\alpha_{i1}, \ldots, \alpha_{ik})$ for all $1 \le i \le m$, where $s^{(i)}$ is used to select bits from $\alpha_i$ to construct $X_i$. First, we show that the distribution of $s^{(i)}$ is uniform over $\mathbb{Z}_n^k$ for all $1 \le i \le m$.

Lemma 1. (Crypto Lemma) [5] Let (C, +) be a compact abelian group with group operation +, and let D=E+F, where E and F are random variables over C and E is independent of F and uniform over C. Then D is independent of F and uniform over C.

Lemma 2.

$$s^{(i)} \xleftarrow{R} \mathbb{Z}_{*n}^k,$$
for all $1 \le i \le m$
if $sv \xleftarrow{R} \mathbb{Z}_{*n}^k$
and
$$p \xleftarrow{f} U(n)^k.$$

Proof. For all $1 \leq i \leq m$ and $1 \leq j \leq k$, we have $\alpha_{ij} = sv_j + (i-1) \cdot p_j$ mod n, where $sv \xleftarrow{R} \mathbb{Z}_n^k$ and $$p_j \xleftarrow{f} U(n)^{(k)}.$$

Lemma 1 can be applied to arrive at the result.

Definition 1. Define $X^i = (X_1, \ldots, X_{i-1}, X_{i+1}, \ldots, X_m)$.

The adversary is given $X^{-i}$ that is all but the $i^{th}$ bit of X. We will show that the probability distribution of $s^{(i)}$ does not change and $X^{-i}$ reveals no information about it.

Lemma 3. $X_i$ and $X_j$ are independent for all $i \neq j$ given $\alpha \xleftarrow{R} \{0,1\}^{kn}$.

Proof. For a primitive element $p \in \mathbb{Z}$, i.p$\neq$j.p for $i \neq j$, i, j $\leq$ n. Therefore $\alpha_{ia} \neq \alpha_{ja}$ $X_i$ and $X_j \forall a, i \neq j$.

This implies that the set of bits in a used to compute $X_i$ and $X_j$ have no bit in common. Hence $X_i$ and $X_j$ are mutually independent.

Lemma 4. $Pr[X_i | s^{(i)}] = Pr[X_i]$, for any $1 \leq i \leq m$ and $s^{(i)} \in \mathbb{Z}_k^n$ and $$\alpha \xleftarrow{R} \{0, 1\}^{kn}$$

This can be proved by a simple counting argument.

Lemma 5. For $$\alpha \xleftarrow{R} \{0, 1\}^{kn}$$

and any $I \in \{1 \ldots m\}$, $$Pr[s^{(i)} | X^{-i}] = Pr[s^{(i)}]$$

Proof. We will prove this for i=m. Proof for any other i will be the same.

Since each $X_i$ depends on different bits of $\alpha$ (lemma 3)

$$Pr[s^{(m)} | X^{-m}] = \frac{Pr[s^{(m)}] \cdot \prod_{j=1}^{m-1} Pr[X_j | s^{(m)}]}{\prod_{j=1}^{m-1} Pr[X^j]} \quad (1)$$

Using Lemma 4 and rules for calculating marginal probability, we can show $$Pr[X_j | s^{(m)}] = Pr[X_j] \quad (2)$$

From (1) and (2), we have $$Pr[s^{(m)} | X^m] = Pr[s^{(m)}]$$

Thus for $$sv \xleftarrow{R} \mathbb{Z}_n^k s^{(i)}$$

is uniformly distributed over $\mathbb{Z}_n^k$ for all i and the distribution of keys $s^{(i)}$ do not change even when $X^{-i}$ is known.

B. Setting Up Proof of Security

Having proved results concerning the distribution of keys, we now define some concepts used and derive preliminary results.

Definition 2. Let $K = n^k$ and $N = 2^{kn}$. Let $S = (s_1, s_2, \ldots, s_k)$ be all possible key values $s^{(i)}$ can take where $(s_1, s_2, \ldots, s_k) \in \mathbb{Z}_n^k$ and $(\alpha_1, \alpha_2, \ldots, \alpha_n)$ be enumeration of all possible random strings in $\{0, 1\}^{kn}$.

Definition 3. For any $\beta \in \{0,1\}^{kn}$, $\beta = (\beta_1, \beta_2, \ldots, \beta_k)$ and $s = (\alpha_1, \alpha_2, \ldots, \alpha_k) \in \mathbb{Z}_n^k$, defines $s(\beta) = \oplus_{j=1}^k [\alpha_j]$.

Definition 4. For a bit $b \in \{0,1\}$, we define $\overline{b} = (-1)^b$. For a sequence $B = (b_i, \ldots, b_n)$, we define $\overline{B} = (\overline{b}_1, \ldots, \overline{b}_r)$.

Definition 5. For a given string $\alpha \in \{0,1\}^{kn}$, we define $v(\alpha) = (\overline{s_1(\alpha)}, \overline{s_2(\alpha)}, \ldots, \overline{s_k(\alpha)})$.

Definition 6. For a vector $v = (v_1, \ldots v_r) \in \{-1, 1\}^r$, define discrepancy of v to be $dv = |\Sigma_{i=1}^r v_i|$ Lemma 6. Let $\alpha \in \{0,1\}^{kn}$, $\alpha = (\alpha_1, \alpha_2, \ldots, \alpha_k)$ be such that fractions of 0's and 1's are both no less that 3/10 in $\alpha$, then $$d(v(\alpha)) < \frac{K}{2^{2k/3}}$$

The proof results using Lemma 4.1 in [9] and LaGrange multipliers.

Corollary 1. Define $$\mathcal{D} = \left\{ \alpha \in \{0, 1\}^{kn} : d(v(\alpha)) \geq \frac{K}{2^{\frac{2k}{3}}} \right\}$$

Then $|\mathcal{D}| < 2^{ckn}$ where c=0.697.

Proof Let $z(\alpha)$ be a number of zeros in $\alpha$. By previous lemma, if $$d(v) \geq \frac{K}{2^{\frac{2k}{3}}},$$

then $z(\alpha) < 3kn/16$ or $z(\alpha) > 13kn/16$ and $\mathbb{E}(z(\alpha)) = kn/2$. We use Chernoff bound to obtain the result.

Definition 7. Define K×N dimensional matrix as $$\begin{bmatrix} \overline{s_1(\alpha_1)} & \ldots & \overline{s_1(\alpha_N)} \\ \vdots & \ddots & \vdots \\ \overline{s_K(\alpha_1)} & \ldots & \overline{s_K(\alpha_N)} \end{bmatrix}$$

Lemma 7. For every $\alpha, \beta \in \{0, 1\}^{kn}$ and $s \in S$ $$s(\alpha \oplus \beta) = s(\alpha) \oplus s(\beta),$$

$$\overline{s(\alpha)} \cdot \overline{s(\beta)} = \overline{s(\alpha \oplus \beta)}$$

and $$|v(\alpha) \cdot v(\beta)| = d(v(\alpha \oplus \beta))$$

where $\overline{s(\alpha)} \cdot \overline{s(\beta)}$ is multiplication and $v(\alpha) \cdot v(\beta)$ is the dot product between vectors.

Lemma 8. For each fixed i, the number of entries $h_{i,j}$ in the $i^{th}$ row of matrix $H=V^T V$ such that $$|h_{i,j}| > \frac{K}{2^{\frac{2k}{3}}}$$

is at most $2^{ckn}$.

Lemma 8 follows lemma 1 and 7 above.

Lemma 9. Let $\alpha$ be fixed. Let $A=(A_1, A_2)$ be the adversary's algorithm. Suppose that $$\left|Pr[A_2(A_1(a), p, s, X \oplus M^{(1)}) = 1] - Pr[A_2(A_1(a), p, s, X \oplus M^{(0)}) = 1]\right| = p$$

when probability is taken over a uniformly random secret key s. Then for $$r \xleftarrow{R} \{0, 1\},$$

and a uniformly random secret key s $$Pr[A_2(A_1(a), p, s, X \oplus M^{(r)}) = r] = \frac{1}{2} \pm \frac{p}{2}.$$

The converse is also true. For proof see Lemma 1 in [2].

Lemma 9 tells us that if an algorithm is able to distinguish between two randomly selected messages with probability p then the algorithm can decrypt any message correctly with probability ½+p/2. That is the algorithm performs better than a random guess only by probability p/2. This equivalence of cases helps us to write the main theorem in a different way. Instead of showing that any algorithm $A_2$ can distinguish between two messages with a probability exponentially small in k, we can show that any $A_2$ can decrypt the message bit correctly with exponentially small probability k.

C. Single Bit Security

Now we can prove the security of a 1-bit message. We have a secret key z and generate only $s^{(1)}$ from it. There is only one key $s^{(1)}$ so we denote it by s. Since in our protocol $$sv \xleftarrow{R} \mathbb{Z}_n^k,$$

by Lemma 2 we conclude that $$s = s^{(1)} \xleftarrow{R} S$$

where $S=(s_1, \ldots, s_k)$ is all possible enumerations of keys and s is independent of the choice of $p=(p_1, \ldots, p_k)$ where $z=(sv, p)$. The fact that s is uniformly distributed over S is important in the proof. We find the probability with which $A_2$ calculates $s(\alpha)=s^{(1)}(\alpha)$ correctly given $A_1(\alpha)$, s and p.

Since s=sv, if we show that $A_2$ cannot compute $s(\alpha)$ correctly given $A_1(\alpha)$, s and p then we can conclude that $A_2$ cannot compute the same given $A_1(\alpha)$, z=(sv, p) as the input is the same in both cases. Thus we can prove our main theorem for a single bit message.

Definition 8. Let $\alpha \in \{0, 1\}^{kn}$, $p \in U(n)^k$, and $\eta \in \{0, 1\}^{0.3n}$ be fixed. We say that the algorithm $A_2$ using $\eta$ and p is good for $\alpha$ if for $$s \xleftarrow{R} S$$

$$\left|Pr[A_2(\eta, p, s) = s(\alpha)] - \frac{1}{2}\right| \geq 2^{-k/3}$$

Definition 9. We define $$B_{\eta,p} = (A_2(\eta, p, s_1), \ldots, A_2(\eta, p, s_K)),$$

where $s_1, \ldots, s_K$ are enumerations of all possible secret keys.

Definition 10. For all possible answer vectors $B_{\eta,p}$, define $$L_{B_{\eta,p}} = \left\{\alpha \in \{0, 1\}^{kn}: \left|\overline{B_{\eta,p}} \cdot v(\alpha)\right| \geq \frac{2k}{2^{k/3}}\right\}$$

or $$L_{B_{\eta,p}} = \left\{\alpha \in \{0, 1\}^{kn}: \left\|Pr[A_2(\eta, p, s) = s(\alpha)] - \frac{1}{2}\right| \geq 2^{\frac{k}{3}}\right\}.$$

$L_{B_{\eta,p}}$ is the set of $\alpha$ which are good for $\eta$ and p. We now show that the set $L_{B_{\eta,p}}$ is small compared to the set of all possible enumerations of $\alpha$ which will imply that for almost all $\alpha$, the probability of correct decryption is exponentially small in k.

Lemma 10. For any fixed $$\eta \in \{0, 1\}^{kn},$$

$$p \in U(n)^k,$$

$$|L_{B_{\eta,p}}| \leq 2^{kcn+\frac{2k}{3}},$$

for any c=0.697.

The proof uses Cauchy-Schwartz inequality. For more details see Lemma 1 in cite paper.

Consider $A_1^{-1}(A_1(\alpha)) = \{\beta \in \{0, 1\}^{kn}: A_1(\beta) = A_1(\alpha)\}$.

We prove the following result and the 1-bit security will follow.

Lemma 11. For any algorithm $A_1: \{0, 1\}^{kn} \to \{0, 1\}^{0.3n}$ and $$\alpha \xleftarrow{R} \{0, 1\}^{kn},$$

we have $$Pr\left[\left|A_1^{-1}(\alpha)\right| < 2^{0.699kn}\right] < 2^{-0.001n}.$$

We can obtain the bound in 11 by simply counting argument.

Lemma 12. For any algorithm $A_1: \{0, 1\}^{kn} \to \{0, 1\}^{0.3n}$, any decoding algorithm $A_2$. $\alpha \xleftarrow{R} \{0, 1\}^{kn}$, and $p \in U(n)^k$, we have $$Pr\left[\left|\overline{B_{A_1(\alpha),p}} \cdot v(\alpha)\right| \geq \frac{2K}{2^{\frac{k}{3}}}\right] < 2^{-0.001n+1},$$

where $L_{A_{1(\alpha),p}} = (A_2(A_1(\alpha), p, s_1) \ldots, A_2(A_1(\alpha), p, s_k))$.
Proof By Lemma 10, we have $$\left|L_{B_{\eta,p}}\right| \leq 2^{kcn + \frac{2k}{3}},$$

where $c = 0.697$ for all $\eta$. Therefore for $A_1(\alpha) = \eta$, $\alpha \xleftarrow{R} A_1^{-1}(\eta)\left(\text{as } \alpha \xleftarrow{R} \{0, 1\}^{kn}\right)$ and for $\left|A_1^{-1}(A_1(\alpha))\right| > 2^{0.699kn}$, $$Pr\left[\left|\overline{B_{\eta,p}} \cdot v(\alpha)\right| < \frac{2^{0.697kn + \frac{2k}{3}}}{2^{0.699kn}} = 2^{-0.002kn + 2k/3} < 2^{-0.001n}\right]$$

The last step follows from the fact that k>1.
From $Pr[|A_1^{-1}(A_1(\alpha))| < 2^{0.699kn}] < 2^{-0.001n}$ (Lemma 11) and equation (3), we arrive at $$Pr\left[\left|\overline{B_{A_1(\alpha),p}} \cdot v(\alpha)\right| \geq \frac{2K}{2^{\frac{k}{3}}}\right] < 2^{-0.001n} + 2^{-0.001n} = 2^{-0.001n+1}$$

Lemma 13. For m=1, any algorithm $A_1$ and any decoding algorithm $A_2$ defined earlier, $$\alpha \xleftarrow{R} \{0, 1\}^{kn} \text{ and } s \xleftarrow{R} S$$

$$\left|Pr[A_2(A_1(\alpha), p, s) = s(\alpha)] - \frac{1}{2}\right| \leq 2^{-\frac{k}{3}} + 2^{-0.001n+1}$$

The lemma follows from result 12.
Lemma 14. Let $\alpha \in \{0, 1\}^{kn}$ be fixed. Suppose that for $$r \xleftarrow{R} \{0, 1\} \text{ and } s \xleftarrow{R} S$$

$$Pr[A_2(A_1(\alpha), p, s, s(\alpha) \oplus r) = r] \geq q$$

Then there is an algorithm $\overline{A} = (\overline{A_1}, \overline{A_2})$ for $\alpha$ such that for $$s \xleftarrow{R} S$$

$$Pr[\overline{A_2}(\overline{A_1}(\alpha), p, s) = s(\alpha)] \geq q.$$

Lemma 15. For m=1, any algorithm $A_1$ and any decoding algorithm $A_2$ defined earlier, $$\alpha \xleftarrow{R} \{0, 1\}^{kn}, sv \xleftarrow{R} \mathbb{Z}_n^k \text{ and } p \xleftarrow{f} U(n)^k$$

for any probability distribution $f$ over the set, we have $$|Pr[A_2(A_1(\alpha), z, s(\alpha) \oplus 1) = 1] - Pr[A_2(A_1(\alpha), z, s(\alpha) \oplus 0) = 1]| <$$
$$2^{-k/3} + 2^{-0.001n+1}$$

Proof From Lemmas 13 and 14, we have for any algorithm $A_1: \{0, 1\}^{kn} \to \{0, 1\}^{0.3n}$, and any decoding algorithm $$A_2, r \xleftarrow{R} \{0, 1\}, \text{ for } \alpha \xleftarrow{R} \{0, 1\}^{kn} \text{ and } s \xleftarrow{R} S,$$

we have $$\left|Pr[A_2(A_1(\alpha), p, s, s(\alpha) \oplus r) = r] - \frac{1}{2}\right| \leq 2^{-\frac{k}{3}} + 2^{-0.001n+1} \quad (4)$$

Now from Lemma 10 and (4) we have $$|Pr[A_2(A_1(\alpha), s, s(\alpha) \oplus 1) = 1] -$$
$$Pr[A_2(A_1(\alpha), p, s, s(\alpha) \oplus 0) = 1]| < 2^{-k/3} + 2^{-0.001n+1}$$

If we are given s, p then we calculate z=(sv, p) and vice versa. This means that for every algorithm $A_2(A_1(\alpha), p, s, s(\alpha) \oplus r)$, there exists an algorithm $A'_2(A_1(\alpha), z, s(\alpha) \oplus r)$ that computes the same output and vice versa.

Combining the above argument with lemma 15, we get $$\left|Pr[A_2(\eta, X^{-m}, s^{(m)}, p) = s^m(\alpha)] - \frac{1}{2}\right| \leq 2^{-k/3} + 2^{-0.001n+1}$$

Hence, we have proved the security of the protocol when the message is of length 1.

D. Multi-Bit Security

We will show security for a message of m>1. To establish the security, we consider the following problem: the adversary is given all but one bit of X and aim is to compute the missing bit of X.

We consider the adversary is given $X_1, \ldots X_{m-1}$ and $s^{(m)} = s$ and it computes $\delta = A_2(\eta, X^{-m}, s^m)$. We show the probability of computing $\delta = X_m$ is less than $$\frac{1}{2} + 2^{-\frac{k}{3}}.$$

The proof of any other $s^{(i)}$ will be similar.
By Lemma 5, we have shown that the distribution of $s^{(m)}$ is uniform given $X^{-m}$. So $$s^m = s \xleftarrow{R} (s_1, \ldots, s_K)$$

i.e., the probability distribution of s does not change even if $X^{-m}$ is given. Adversary calculates $A_1(\alpha)=\eta$ and then $A_2(\eta, X^{-m}, s^{(m)}, p)=s^{(m)}(\alpha)$.

All lemmas in this section are either slight modifications of lemmas in previous sections and their proofs are similar, or the proofs can be found in reference [2] listed below.

Definition 11. Let $\alpha \in \{0, 1\}^{kn}$, $\eta \in \{0, 1\}^{0.3n}$, $X^{-m}$ and $p \in U(n)^k$ be fixed. We say that algorithm $A_2$, using $\eta$, is good for $\alpha$ if for $$s^m = s \xleftarrow{R} S$$

$$\left| Pr[A_2(\eta, X^{-m}, s, p) = s(\alpha)] - \frac{1}{2} \right| \geq 2^{-k/3}$$

Definition 12. For fixed $\eta \in \{0, 1\}^{0.3n}$ and $X^{-m}$, define $$B_\eta, X^{-m}, p = (A_2(\eta, X^{-m}, s_1, p) \ldots, A_2(\eta, X^{-m}, s_K, p)).$$

Definition 13. For given $B_\eta$, $X^{-m}$, p, define $$L_{B_{\eta,X^{-m},p}} = \left\{ \alpha \in \{0, 1\}^{kn}: \left| \overline{B_{\eta,X^{-m},p}} \cdot v(\alpha) \right| \geq \frac{2K}{2^{k/3}} \right\}$$

Lemma 16. For any fixed $\eta \in \{0,1\}^{0.3n}$ and any fixed $X^{-m}$, $|L_{B_{\eta,X^{-m},p}}| \leq 2^{kcn+2k/3}$, where c=0.697.

Lemma 17. For any algorithm $$A_1: \{0, 1\}^{kn} \to \{0, 1\}^{0.3n}, \text{ for } \alpha \xleftarrow{R} \{0, 1\}^{kn}$$

for any $X^{-m}$ and p $$Pr\left[ \left| A_1^{-1}(A_1(\alpha)) \right| < 2^{0.699kn} \right] < 2^{-0.001n}$$

The proof follows from lemma 11.

Lemma 18. For any fixed $X^{-m}$, p, algorithm $A_1$, and any decoding algorithm $A_2$, for $$\alpha \xleftarrow{R} \{0, 1\}^{kn}$$

$$Pr\left[ \left| \overline{B_{A_1(\alpha),X^{-m},p}} \cdot v(\alpha) \right| \geq \frac{2K}{2^{\frac{k}{3}}} \right] < 2^{-0.001n}$$

This lemma follows from lemma 12.

Lemma 19. For any algorithm $A_1: \{0, 1\}^{kn} \to \{0, 1\}^{0.3n}$ for any decoding algorithm $A_2$ for $$\alpha \xleftarrow{R} \{0, 1\}^{kn} \text{ and } s \xleftarrow{R} S, X^{-m}, s^m \xleftarrow{R} S, p$$

$$\left| Pr[A_2(\eta, X^{-m}, s^{(m)}, p) = s^m(\alpha)] - \frac{1}{2} \right| \leq 2^{-k/3} + 2^{-0.001n+1}$$

The proof follows from lemma 13.

So in general for $1 \leq i \leq m$ and any such pair of algorithms $A_1, A_2$ $$\left| Pr[A_2(\eta, X^{-i}, s^{(i)}, p) = s^i(\alpha)] - \frac{1}{2} \right| \leq 2^{-k/3} + 2^{-0.001n+1}$$

Lemma 20. Suppose that $$\left| Pr[A_2(A_1(\alpha), p, s, X \oplus M^{(1)}) = 1] - Pr[A_2(A_1)(\alpha), p, s, X \oplus M^{(0)}) = 1] \right| = p$$

where probability is taken over uniformly random $\alpha$ and s. Then there is an $1 \leq i \leq m$ and an algorithm $B=(B_1, B_2)$ such that $$\left| Pr[B_2(B_1(\alpha), p, s, X^{-i}) = X_i] - \frac{1}{2} \right| \geq \frac{p}{2m}$$

For proof see [2], Lemma 23.

Using lemma 20 and (5) we prove multi-bit security and replacing p, s, with z, the main theorem is proved.

13. REFERENCES

Each of the following references is hereby incorporated by reference as if fully set forth herein, except for terminology inconsistent with that used herein.
1. U. M. Maurer, "Conditionally-perfect secrecy and a provably-secure randomized cipher", J. Cryptology 5, Pages 53-66, 1992. University Science, 1989.
2. Y. Aumann, Yan Zong Ding and M. O. Rabin, "Everlasting security in the bounded storage model", in IEEE Transactions on Information Theory, vol. 48, no. 6, pp. 1668-1680. June 2002.
3. C. E. Shannon, "Communication theory of secrecy systems", in The Bell System Technical Journal, vol. 28, no. 4, pp. 656-715, October 1949.
4. Shafi Goldwasser, Silvio Micali, "Probabilistic encryption", Journal of Computer and System Sciences, Volume 28, Issue 2; Pages 270-299, 1984.
5. G. David Forney Jr., "On the role of MMSE estimation in approaching the information-theoretic limits of linear Gaussian channels: Shannon meets wiener," arXiv preprint cs/0409053, 2004.
6. T. Elgamal, "A public key cryptosystem and a signature scheme based on discrete logarithms," in IEEE Transactions on Information Theory, vol. 31, no. 4, pp. 469-472, July 1985.
7. W. Diffie and M. Hellman, "New directions in cryptography;" in IEEE Transactions On Information Theory, vol. 22, no. 6. pp. 644-654, November 1976.
8. Biham, Eli, and Adi Shamir, "Differential cryptanalysis of DES-like cryptosystems." Journal of CRYPTOLOGY 4.1 (1991): 3-72.
9. R. G. Gallager, "Low-Density Parity-Check Codes", Cambridge, MA: MIT Press. 1963.
10. C. H. Bennett, G. Brassard, C. Crepeau and U. M. Maurer, "Generalized privacy amplification", in IEEE Transactions on Information Theory, vol. 41, no. 6, pp. 1915-1923, November 1995.
11. C. Cachin and U. Maurer, "Unconditional security against memory bounded adversaries", in Advances in Cryptology—Crypto '97, 1997.

12. S. Dziembowski and U. Maurer, "Tight security proofs for the bounded-storage model" in Proceedings of the thirty-fourth annual ACM symposium on Theory of computing (STOC '02).
13. Lu, Chi-Jen. "Hyper-Encryption against Space-Bounded Adversaries from On-Line Strong Extractors." CRYPTO '02 Proceedings of the 22nd Annual International Cryptology Conference on Advances in Cryptology, 2002, pp. 257-271.
14. E. Savas and B. Sunar, "A practical and secure communication protocol in the bounded storage model". In Proceedings of the 4th international conference on Networking—Volume Part II (ICN'05). Springer-Verlag, Berlin, Heidelberg, 707-717.
15. M. O. Rabin, "Provably unbreakable hyper-encryption in the limited access model," IEEE Information Theory Workshop on Theory and Practice in Information-Theoretic Security, 2005, pp. 34-37

What is claimed is:

1. A method implemented on a hardware processor for secure remote digital storage or transmission of a ciphertext message, the method comprising:
  a. determining a maximum storage capacity B of an adversary;
  b. determining a security parameter k, wherein $1 \ll k \ll m$, where m is a number of message bits;
  c. determining a prime number n, such that $B \leq 0.3kn$
  d. reading from a public site a current public portion of a random string a that comprises k elements and each k element comprising n random bits, wherein the current public portion is a next n random bits;
  e. privately sharing with a receiving node a secret key z, wherein z has 2k elements, comprising k additive co-primes of n and k multiplicative co-primes of n;
  f. determining an encryption key X based on the secret key z and the current public portion of the random string a;
  g. determining a plaintext message M of length $\leq m$;
  h. encrypting the plaintext message M as $Y=M \oplus X$ to create a ciphertext message Y; and
  i. placing the ciphertext message Y on a public forum for receiving by the receiving node.

2. The method of claim 1, wherein the current public portion of the random string is determined and placed on the public site by a trusted third party.

3. The method of claim 1, wherein the receiving node receives and decrypts the ciphertext message Y as $M=X \oplus Y$ to retrieve the plaintext message M.

4. A non-transitory computer-readable medium carrying one or more sequences of instructions for secure digital storage, wherein execution of the one or more sequences of instructions by one or more processors causes the one or more processors to perform the steps of:
  a. determining a maximum storage capacity B of an adversary;
  b. determining a security parameter k, wherein $1 \ll k \ll m$, where m is a number of message bits;
  c. determining a prime number n, such that $B \leq 0.3kn$
  d. reading from a public site a current public portion of a random string a that comprises k elements and each k element comprising n random bits, wherein the current public portion is a next n random bits;
  e. privately sharing with a receiving node a secret key z, wherein z has 2k elements, comprising k additive co-primes of n and k multiplicative co-primes of n;
  f. determining an encryption key X based on the secret key z and the current public portion of the random string a;
  g. determining a plaintext message M of length $\leq m$;
  h. encrypting the plaintext message M as $Y=M \oplus X$ to create a ciphertext message Y; and
  i. placing the ciphertext message Y on a public forum for receiving by the receiving node.

5. A method implemented on a hardware processor for securely receiving a ciphertext message, the method comprising:
  a. reading from a public site a current public portion of a random string a that comprises k elements, wherein each of the k elements is a security parameter, and that $1 \ll k \ll m$, wherein m is a number of message bits and each k element comprising n random bits, wherein the current public portion is a next n random bits, and n is a prime number;
  b. receiving from a sending node a secret key z, wherein z has 2k elements, comprising k additive co-primes of n and k multiplicative co-primes of n;
  c. determining an encryption key X based on the secret key z and the current public portion of the random string a;
  d. receiving a ciphertext message Y of length $\leq m$; and
  e. decrypting the ciphertext message Y as $M=X \oplus Y$ to obtain a plaintext message M of length $\leq m$.

6. A non-transitory computer-readable medium carrying one or more sequences of instructions for secure digital storage, wherein execution of the one or more sequences of instructions by one or more processors causes the one or more processors to perform the steps of:
  a. read from a public site a current public portion of a random string a that comprises k elements, wherein each of the k elements is a security parameter, and that $1 \ll k \ll m$, wherein m is a number of message bits and each k element comprising n random bits, wherein the current public portion is a next n random bits, and n is a prime number;
  b. receive from a sending node a secret key z, wherein z has 2k elements, comprising k additive co-primes of n and k multiplicative co-primes of n;
  c. determine an encryption key X based on the secret key z and the current public portion of the random string a;
  d. receive a ciphertext message Y of length $\leq m$; and
  e. decrypte the ciphertext message Y as $M=X \oplus Y$ to obtain a plaintext message M of length $\leq m$.

7. A system for secure remote digital storage comprising:
  at least one processor; and
  at least one memory including one or more sequences of instructions, the at least one memory and the one or more sequences of instructions configured to, with the at least one processor, cause the system to perform at least the following,
  a. determining a maximum storage capacity B of an adversary;
  b. determining a security parameter k, wherein $1 \ll k \ll m$;
  c. determining a prime number n, such that $B \leq 0.3kn$
  d. reading from a public site a current public portion of a random string a that comprises k elements and each k element comprising n random bits, wherein the current public portion is a next n random bits;
  e. privately sharing with a receiving node a secret key z, wherein z has 2k elements, comprising k additive co-primes of n and k multiplicative co-primes of n;

f. determining an encryption key X based on the secret key z and the current public portion of the random string a;
g. determining a plaintext message M of length ≤m;
h. encrypting the plaintext message M as $Y=M\oplus X$ to create a ciphertext message Y; and
i. placing the ciphertext message Y on a public forum for receiving by the receiving node.

\* \* \* \* \*